(12) United States Patent
Yoshida et al.

(10) Patent No.: US 12,415,630 B2
(45) Date of Patent: Sep. 16, 2025

(54) DETECTION DEVICE

(71) Applicant: NEC Corporation, Tokyo (JP)

(72) Inventors: Jun Yoshida, Tokyo (JP); Katsuaki Taya, Tokyo (JP); Taichiro Sano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 18/526,783

(22) Filed: Dec. 1, 2023

(65) Prior Publication Data

US 2024/0190591 A1 Jun. 13, 2024

(30) Foreign Application Priority Data

Dec. 7, 2022 (JP) ................................. 2022-195753

(51) Int. Cl.
*B64G 3/00* (2006.01)
(52) U.S. Cl.
CPC ...................... *B64G 3/00* (2013.01)
(58) Field of Classification Search
CPC ....................................................... B64G 3/00
See application file for complete search history.

(56) References Cited

U.S. PATENT DOCUMENTS

| 2011/0227786 | A1* | 9/2011 | Ono | G01S 19/20 |
| | | | | 342/357.23 |
| 2012/0137367 | A1* | 5/2012 | Dupont | G06F 21/00 |
| | | | | 726/25 |
| 2013/0305357 | A1* | 11/2013 | Ayyagari | H04L 41/069 |
| | | | | 726/22 |
| 2015/0175028 | A1* | 6/2015 | Fukui | B61B 13/00 |
| | | | | 701/22 |
| 2020/0326190 | A1* | 10/2020 | Miyao | G01C 21/28 |
| 2021/0263164 | A1* | 8/2021 | Gunning | G01S 19/07 |
| 2023/0003907 | A1* | 1/2023 | Grayson | G01S 19/423 |
| 2023/0130388 | A1* | 4/2023 | Reid | G01S 19/02 |
| | | | | 342/357.44 |

FOREIGN PATENT DOCUMENTS

JP 2021-126910 A 9/2021

* cited by examiner

*Primary Examiner* — Hunter B Lonsberry
*Assistant Examiner* — Jalal C Coduroglu
(74) *Attorney, Agent, or Firm* — Sughrue Mion, PLLC

(57) ABSTRACT

A detection device includes a generation unit that generates feature values representing features of a plurality of pieces of orbit data, on the basis of the orbit data representing a state of each flying object included in a flying object group, an inference unit that acquires a value corresponding to a state of the flying object group on the basis of the feature values generated by the generation unit, and a detection unit that detects an abnormality having occurred in the flying object group on the basis of the value corresponding to the state of the flying object group acquired by the inference unit.

9 Claims, 11 Drawing Sheets

Fig.3

| TIME INFORMATION | ORBIT DATA X | ORBIT DATA Y | ...... |
|---|---|---|---|
| 2018-02-12 1:32:44 | | | |
| 2018-02-12 4:13:00 | | | |
| 2018-02-12 6:45:00 | | | |
| ⋮ | ⋮ | ⋮ | ⋮ |

Fig.4

| TIME INFORMATION | FLYING OBJECT A ORBIT DATA X | FLYING OBJECT A ORBIT DATA Y | ....... | FLYING OBJECT B ORBIT DATA X | ....... |
|---|---|---|---|---|---|
| 2018-02-12 1:00:00 | | | | | |
| 2018-02-12 2:00:00 | | | | | |
| 2018-02-12 3:00:00 | | | | | |
| ⋮ | ⋮ | ⋮ | ⋮ | ⋮ | ⋮ |

Fig.5

| MOVING WINDOW | FEATURE VALUE α | FEATURE VALUE β | ...... |
|---|---|---|---|
| 2018-02-12 1:00-2:59 | | | |
| | | | |
| | | | |
| ⋮ | ⋮ | ⋮ | ⋮ |

DETECTION DEVICE

INCORPORATION BY REFERENCE

The present invention is based upon and claims the benefit of priority from Japanese patent application No. 2022-195753, filed on Dec. 7, 2022, the disclosure of which is incorporated herein in its entirety by reference.

TECHNICAL FIELD

The present invention relates to a detection device, a detection method, and a storage medium.

BACKGROUND ART

Art to be used for detecting an abnormality having occurred in a flying object has been known.

For example, Patent Literature 1 describes a flying device having an abnormality detection unit. According to Patent Literature 1, the abnormality detection unit monitors a detection result of a sensor unit, the state of a battery, and an operating state of a lift generation unit to thereby determine whether or not the flying device is in an abnormal state.

Patent Literature 1: JP 2021-126910 A

SUMMARY

In the case of operating a service utilizing a plurality of flying objects such as mega-constellations in which a plurality of satellites constitute a satellite group, it is necessary to take coordinated operations among the flying objects constituting the flying object group. When operating a service utilizing such a plurality of flying objects, it is desirable to find an abnormality such as uncoordinated operations in the entire flying objects. However, the art described in Patent Literature 1 detects an abnormal state while focusing on a single flying object. Therefore, it is difficult to perform appropriate monitoring, and further, the cost of monitoring is high. This causes a problem that it is difficult to detect an abnormality such as uncoordinated operations occurred in a flying object group including a plurality of flying objects.

In view of the above, an example of an object of the present invention is to provide a detection device, a detection method, and a storage medium capable of solving the above-described problem.

In order to achieve the object, a detection device according to one aspect of the present disclosure is configured to include at least one memory configured to store instructions and at least one processor configured to execute instructions to generate feature values representing features of a plurality of pieces of orbit data, on the basis of the orbit data representing a state of each of flying objects included in a flying object group;

acquire a value corresponding to a state of the flying object group on the basis of the generated feature values; and detect an abnormality having occurred in the flying object group on the basis of the acquired value corresponding to the state of the flying object group.

Further, a detection method according to another aspect of the present disclosure is configured to include, by an information processing device, generating feature values representing features of a plurality of pieces of orbit data, on the basis of the orbit data representing a state of each of flying objects included in a flying object group;

acquiring a value corresponding to a state of the flying object group on the basis of the generated feature values; and detecting an abnormality having occurred in the flying object group on the basis of the acquired value corresponding to the state of the flying object group.

Further, a storage medium according to another aspect of the present disclosure is a non-transitory computer-readable medium storing thereon a program comprising instructions for causing an information processing device to execute processing to:

generate feature values representing features of a plurality of pieces of orbit data, on the basis of the orbit data representing a state of each of flying objects included in a flying object group;

acquire a value corresponding to a state of the flying object group on the basis of the generated feature values; and detect an abnormality having occurred in the flying object group on the basis of the acquired value corresponding to the state of the flying object group.

Further, a learning device according to another aspect of the present disclosure is configured to include at least one memory configured to store instructions and at least one processor configured to execute instructions to generate feature values representing features of a plurality of pieces of orbit data, on the basis of the orbit data representing a state of each of flying objects included in a flying object group; and on the basis of the generated feature values, train a model so as to output a value corresponding to a state of the flying object group in response to an input of the feature values.

With the configurations described above, the problem described above can be solved.

BRIEF DESCRIPTION OF DRAWINGS

FIG. 3 illustrates an example of orbit data information.

FIG. 4 illustrates an example of formatted data information.

FIG. 5 illustrates an example of feature value information.

EXAMPLE EMBODIMENTS

First Example Embodiment

Figure 1:
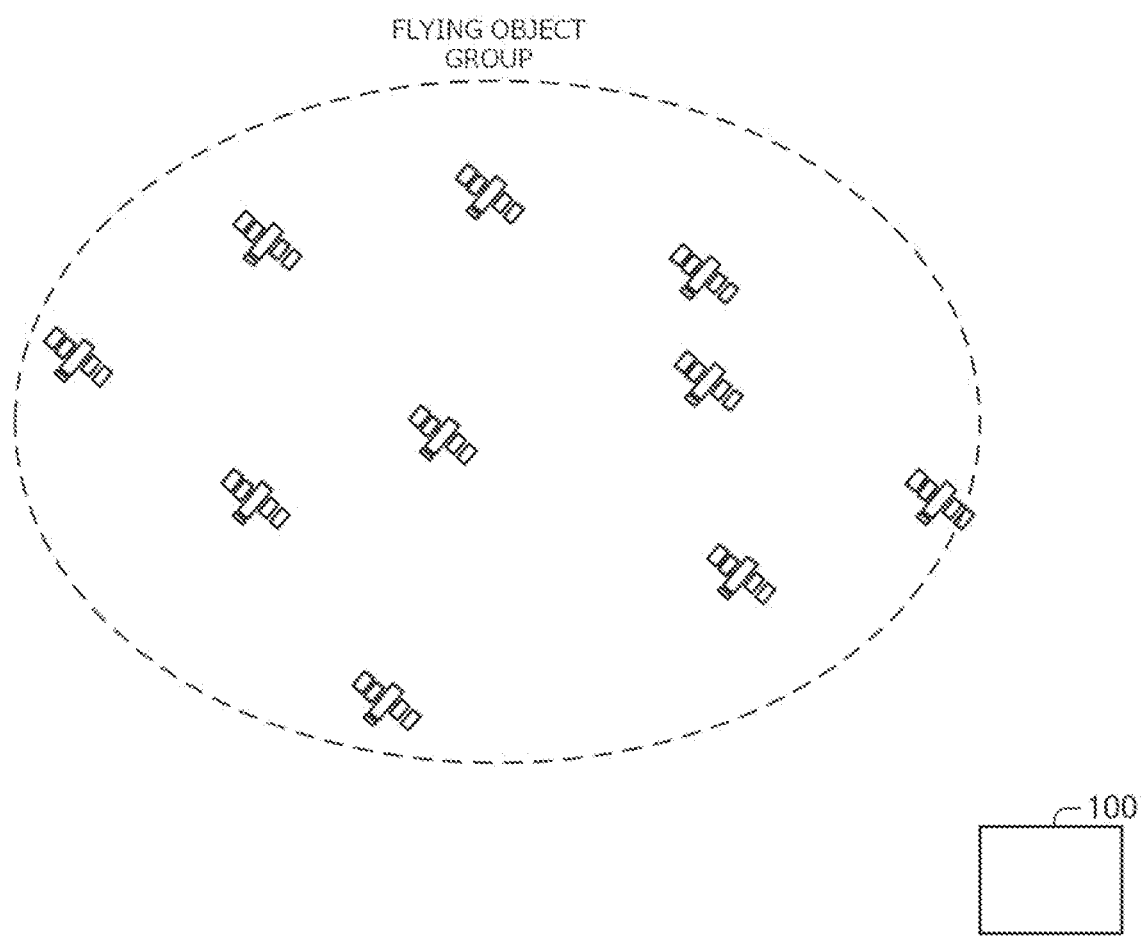
FIG. 1 is a diagram for explaining the outline of the present disclosure.
Figure 2:
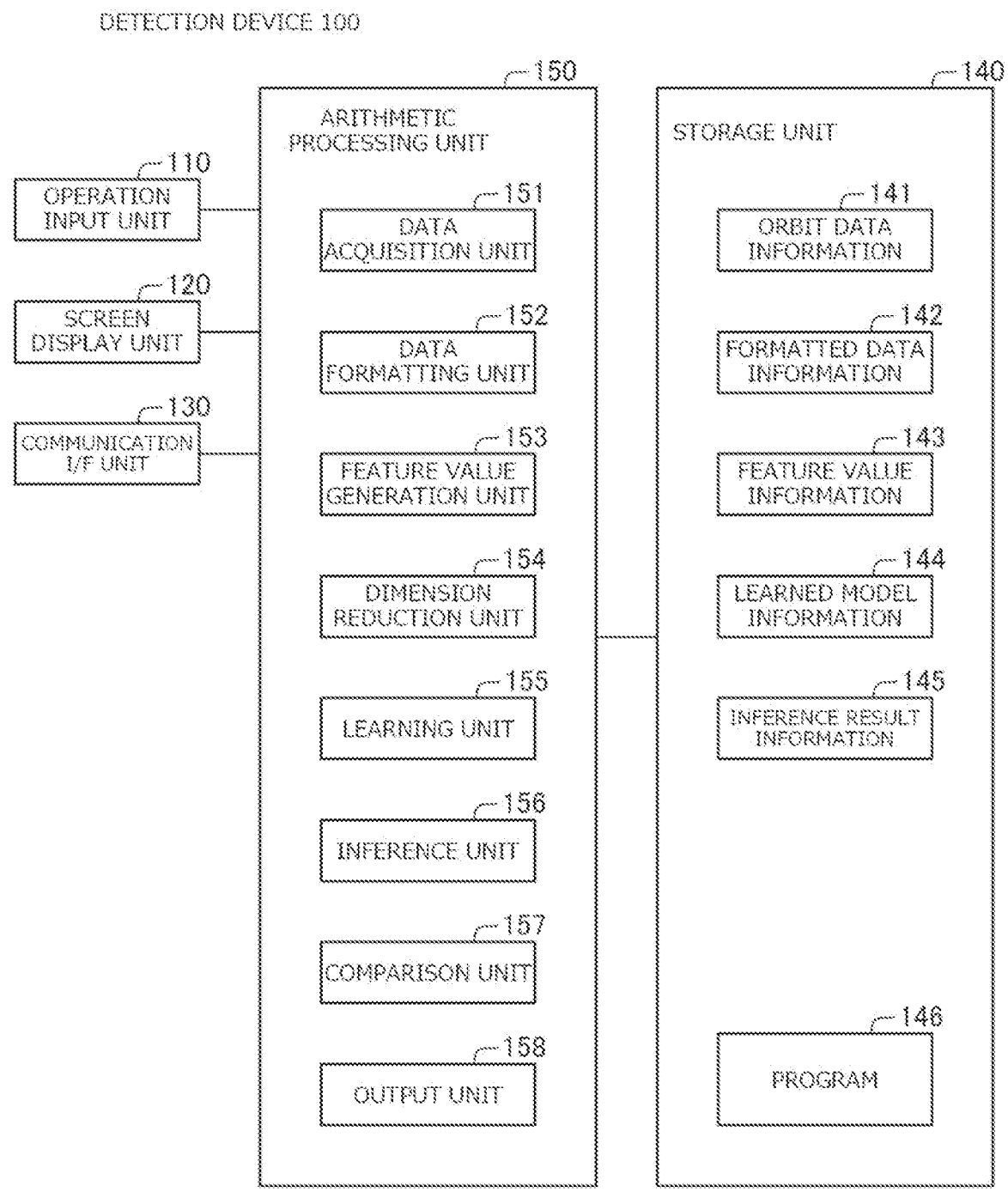
FIG. 2 is a block diagram illustrating an example of a configuration of a detection device.
Figure 6:
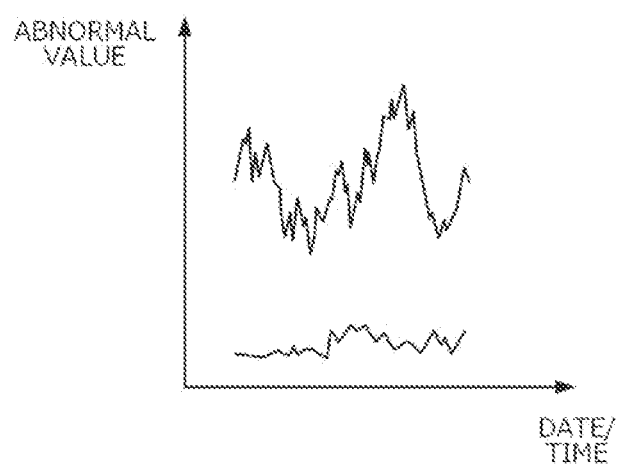
FIG. 6 illustrates an example of inference result information.
Figure 7:
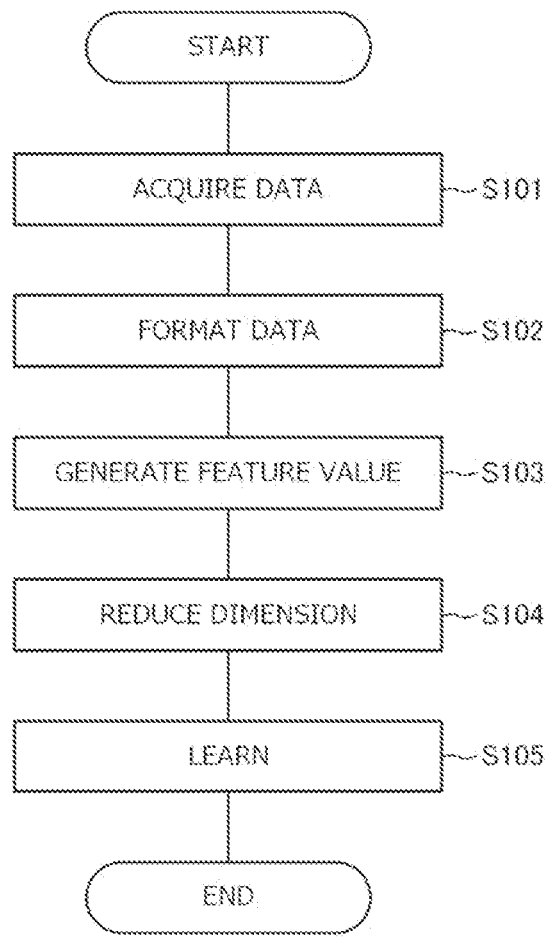
FIG. 7 is a flowchart illustrating an example of operation of a detection device at the time of learning.
Figure 8:
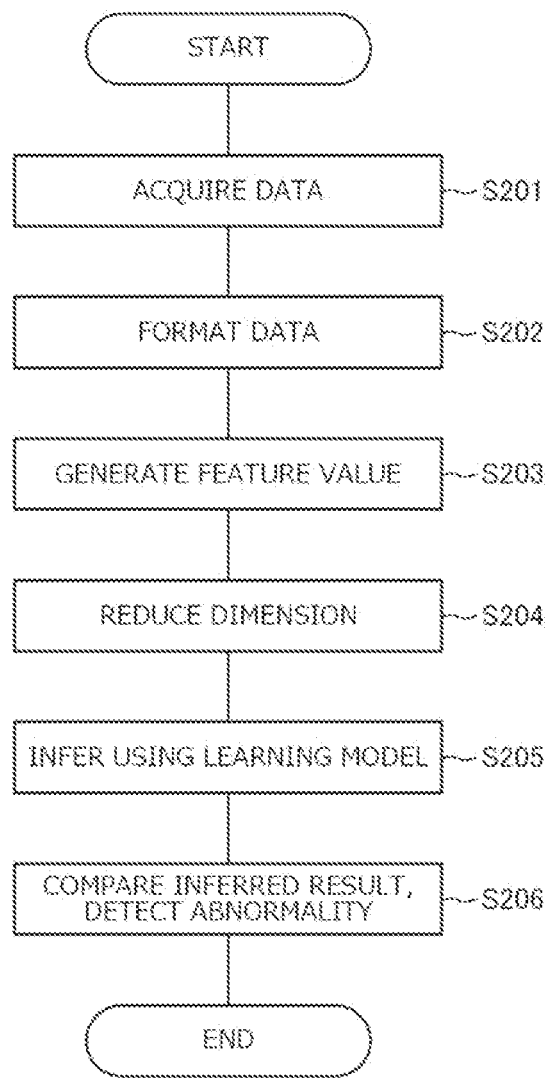
FIG. 8 is a flowchart illustrating an example of operation of a detection device at the time of detecting abnormality.

A first example embodiment of the present disclosure will be described with reference to FIGS. 1 to 8. FIG. 1 is a diagram for explaining the outline of the present disclosure. FIG. 2 is a block diagram illustrating an example of a configuration of a detection device 100. FIG. 3 illustrates an example of orbit data information 141. FIG. 4 illustrates an example of formatted data information 142. FIG. 5 illustrates an example of feature value information 143. FIG. 6 illustrates an example of inference result information 145. FIGS. 7 and 8 are flowcharts illustrating an example of operation of the detection device 100.

A first example embodiment of the present disclosure describes a detection device 100 that detects an abnormality such as uncoordinated operations occurred in a flying object group including a plurality of flying objects as illustrated in FIG. 1. As described below, the detection device 100 acquires orbit data representing the state of each flying object included in the flying object group, for each flying object. Moreover, the detection device 100 generates a plurality of feature values on the basis of orbit data of each flying object included in the flying object group. Then, the detection device 100 learns a model by using the generated feature values. For example, the detection device 100 learns a model by training a deep neural network (DNN) with use of the feature values generated based on the orbit data of the respective flying objects at the normal time having no abnormality.

The detection device 100 also detects an abnormality using the learned model. For example, when the detection device 100 acquires, from each flying object, orbit data in which whether it is in a normal state or an abnormal state is unknown, the detection device 100 inputs the feature values generated based on the unknown orbit data to thereby acquire an output from the model according to the state of the flying object group. Then, the detection device 100 detects an abnormality based on the acquired output. For example, the detection device 100 can detect an abnormality by comparing an output obtained when inputting a feature value based on the orbit data at the normal time into the model with an output obtained when inputting a feature value based on unknown orbit data into the model. The detection device 100 may output the detection result to an external device or the like.

Note that in the present embodiment, a flying object represents an object flying on a predetermined orbit such as a satellite. A flying object is not limited to the aforementioned example. For example, a flying object may be an unmanned aircraft such as a drone or another flying vehicle. A flying object group includes a plurality of flying objects. For example, a flying object group includes flying objects in units of several hundreds to several tens of thousands. The flying objects included in a flying object group may by in any number other than that described above as an example.

The detection device 100 is an information processing device that detects an abnormality such as uncoordinated operations occurred in a flying object group. For example, the detection device 100 acquires orbit data representing the state of each flying object included in a flying object group, from the flying object and other external devices. Then, on the basis of the acquired orbit data of each flying object, the detection device 100 checks whether or not an abnormal state that is a state different from a normal state has occurred in the flying object group.

FIG. 2 illustrates an example of a configuration of the detection device 100. Referring to FIG. 2, the detection device 100 includes, for example, an operation input unit 110, a screen display unit 120, a communication I/F unit 130, a storage unit 140, and an arithmetic processing unit 150, as main constituent elements.

FIG. 2 illustrates the case of implementing the function of the detection device 100 by using one information processing device, as an example. However, the detection device 100 may be implemented by using a plurality of information processing devices such as implemented on the cloud, for example. For example, the detection device 100 may be configured of a learning device having a configuration for learning a model and a detection device that detects an abnormality by using the learned model among the constituent elements described with reference to FIG. 2. The detection device 100 may not include part of the above-mentioned constituent elements such as not including the operation input unit 110 or the screen display unit 120, or may include a constituent element other than those described above.

The operation input unit 110 is configured of operation input devices such as a keyboard and a mouse. The operation input unit 110 detects operation by an operator who operates the detection device 100, and outputs it to the arithmetic processing unit 150.

The screen display unit 120 is a screen display device such as a liquid crystal display (LCD). The screen display unit 120 can display, on the screen, various types of information stored in the storage unit 140, in response to an instruction from the arithmetic processing unit 150.

The communication I/F unit 130 is configured of a data communication circuit. The communication I/F unit 130 performs data communication with an external device connected over a communication network.

The storage unit 140 is a storage device such as a hard disk or a memory. The storage unit 140 stores therein processing information and a program 146 required for various types of processing performed in the arithmetic processing unit 150. The program 146 is read and executed by the arithmetic processing unit 150 to thereby implement various processing units. The program 146 is read in advance from an external device or a storage medium via a data input/output function of the communication I/F unit 130 and the like, and is stored in the storage unit 140. The main information stored in the storage unit 140 includes, for example, orbit data information 141, formatted data information 142, feature value information 143, learned model information 144, inference result information 145, and the like.

The orbit data information 141 includes orbit data representing the state of each flying object included in the flying object group. For example, the orbit data information 141 is acquired in advance by using a method of acquiring it from an external device or the flying object via the communication I/F unit 130, inputting it by using the operation input unit 110, or the like, and is stored in the storage unit 140.

FIG. 3 illustrates an example of the orbit data information 141. Referring to FIG. 3, in the orbit data information 141, time information and a plurality of pieces of orbit data are associated with each other. Here, the time information shows the time when the associated orbit data is acquired by the flying object or other external devices. For example, on the first row of FIG. 3, the time information shows that orbit data is acquired at "2018-02-12 1:32:44". The orbit data includes data showing the state of each flying object. For example, the orbit data may include location information such as coordinate values indicating the location of the flying object, flying condition information such as moving speed and acceleration of the flying object, and the like. The orbit data may also include information representing orbit elements such as an orbit inclination angle, longitude of ascending node, eccentricity, argument of perigee, mean anomaly, and mean motion, and other types of information representing the state of the flying object.

Note that the orbit data information 141 may include information in which time information and orbit data are associated with each other for each flying object in the flying object group. For example, in the example illustrated in FIG. 3, in the orbit data information 141, a table in which time information and orbit data are associated with each other is prepared for each flying object. Depending on the type of a flying object such as the case where the flying object is a satellite, the time at which the orbit data is acquired may not be uniform. In other words, orbit data may be acquired at different timing for each flying object. Therefore, even in the orbit data information 141, the time indicated by the time information may be different for each flying object.

The formatted data information 142 includes information generated by formatting the orbit data information 141 into uniform data. For example, the formatted data information 142 is updated in response to execution of a formatting process or the like. The formatting process is a process of sorting the respective pieces of data included in the orbit data information 141 according to the time, by the data formatting unit 152 to be described below.

FIG. 4 illustrates an example of the formatted data information 142. Referring to FIG. 4, in the formatted data information 142, time information and pieces of orbit data for each flying object included in the orbit data information 141 are associated with each other. As illustrated in FIG. 4 as an example, the formatted data information 142 includes orbit data of each predetermined time such as every hours, for example.

The feature value information 143 includes at least part of the feature values representing the features of a plurality of pieces of orbit data included in the formatted data information 142. For example, the feature value information 143 is updated in response to extraction of at least part of a plurality of feature values generated based on the formatted data information 142 by a dimension reduction unit 154 to be described below.

FIG. 5 illustrates an example of the feature value information 143. Referring to FIG. 5, in the feature value information 143, a moving window and a plurality of feature values are associated with each other. Here, the moving window shows a main range for generating feature values. For example, "2018-02-12 1:00-2.59" on the first row of FIG. 5 indicates that related feature values are generated based on the orbit data from 1:00 to 2:59 on Feb. 12, 2018 in the formatted data information 142. Further, the feature values are values representing the feature of the entire orbit data within the range shown by the moving window or at least part thereof among the orbit data of each flying object constituting the flying object group. For example, the feature value information 143 includes at least partial feature values of the feature values generated by the feature value generation unit 153.

Here, feature values may include statistical values that can be generated from a plurality of pieces of orbit data such as a maximum value, a minimum value, a variance, an average, a mean value, a skewness, a kurtosis, a rate of change, a difference, a peak value, and the like, for example. The feature values may include a value obtained by performing a transform process such as Fourier transform on the generated statistical value or the like, an absolute total value of the statistical values, a value obtained by applying a predetermined process to a statistical value such as covariance. Feature values may include a value according to the past statistical values generated from past related orbit data, tendency fluctuation, or the like. As described above, feature values may include statistical values or values according to the statistical values, for example. Feature values may include values representing the feature of orbit data other than those illustrated above.

The learned model information 144 includes information showing a model trained by using the feature values included in the feature value information 143 so as to output a value corresponding to the state of the flying object group. In other words, the learned model information 144 includes information showing a model trained so as to output a value that can be used for detecting an abnormality having occurred in the flying object group. For example, the learned model information 144 includes information showing a model trained by using feature values based on the orbit data at the normal time in which no abnormality occurs. As an example, the learned model information 144 may include values of various types of parameters included in the DNN. For example, the learned model information 144 is updated corresponding to execution of training based on the feature values included in the feature value information 143 by a learning unit 155 to be described below.

The inference result information 145 includes an abnormal value that is a value corresponding to the state of the flying object group, output by the model in response to input of the feature values to the learned model. In other words, the inference result information 145 includes an abnormal value that is a value that can be used for detecting an abnormality having occurred in the flying object group. The inference result information 145 may include time-series abnormal values corresponding to the feature values for each moving window. For example, the inference result information 145 is updated in response to input of the feature values by an inference unit 156, to be described below, to the model shown by the learned model information 144 and acquisition of an abnormal value that is an output value.

The arithmetic processing unit 150 includes an arithmetic unit such as a central processing unit (CPU) and the peripheral circuits thereof. The arithmetic processing unit 150 reads, from the storage unit 140, and executes the program 146 to implement various processing units through cooperation between the hardware and the program 146. Main processing units to be implemented by the arithmetic processing unit 150 include, for example, the data acquisition unit 151, the data formatting unit 152, the feature value generation unit 153, the dimension reduction unit 154, the learning unit 155, the inference unit 156, a comparison unit 157, an output unit 158, and the like.

Note that the arithmetic processing unit 150 may include a Graphic Processing Unit (GPU), a Digital Signal Processor (DSP), an Micro Processing Unit (MPU), a Floating point number Processing Unit (FPU), a Physics Processing Unit (PPU), a Tensor Processing Unit (TPU), a quantum processor, a microcontroller, or a combination thereof, instead of the CPU.

The data acquisition unit 151 acquires orbit data and the acquisition time of the orbit data from flying objects and other external devices. The data acquisition unit 151 may acquire orbit data and the like together with information indicating that it is confirmed that the state of the flying object group is normal, the state of the flying object group is unknown, or the like. Further, the data acquisition unit 151 stores the acquired orbit data and the like in the storage unit 140 as the orbit data information 141.

For example, the data acquisition unit 151 can acquire orbit data at the normal time in which no abnormality has occurred, as data for learning by the learning unit 155 or the like. The data acquisition unit 151 can also acquire orbit data in a state where it is unknown whether or not an abnormality has occurred, and the like.

The data formatting unit 152 performs a formatting process that is a process of sorting pieces of data included in the orbit data information 141 according to the time. For example, the data formatting unit 152 can perform a formatting process at any timing such as performing the process at predetermined intervals. Further, the data formatting unit 152 stores the result of the formatting process in the storage unit 140 as the formatted data information 142.

As described above, the time of acquiring orbit data by each flying object may be nonuniform. For example, in the example illustrated in FIG. 3, the time at which orbit data of a flying object is acquired is "1:32:44", and the next time is "4:13:00". There is about two hours and forty minutes interval. Therefore, the data formatting unit 152 sorts the orbit data at predetermined time such as "1:00:00", "2:00:00", "3:00:00", and the like. For example, in the example illustrated in FIG. 3, as orbit data of a flying object related to "1:00:00", the data formatting unit 152 adopts orbit data acquired at "1:32:44".

There is a case where orbit data cannot be acquired within a predetermined time by the flying objects. For example, in the example illustrated in FIG. 3, no orbit data is acquired related to "2:00:00" and "3:00:00". In the case where such missing values exist, the data formatting unit 152 can fill the missing values by using an interpolation technique such as linear interpolation. The data formatting unit 152 may fill the missing values by using any interpolation technique. Note that the data formatting unit 152 may be configured to handle the missing values just as missing values.

Further, there is a case where flying objects or the like acquire a plurality of pieces of orbit data in a predetermined period of time such as the case where a plurality of pieces of orbit data are acquired between "1:00:00" and "2:00:00". In that case, the data formatting unit 154 can calculate any statistical values such as calculating an average value or a mean value of the pieces of orbit data and adopt the calculated statistical value as formatted orbit data. The data formatting unit 152 may adopt orbit data selected by any means instead of calculating statistical values.

For example, as described above, by filling missing values or processing overlapped values, the data formatting unit 152 sorts the pieces of data included in the orbit data information 141 according to the predetermined time. Since the data formatting unit 152 performs the formatting process, for example, it is possible to combine the tables for the respective flying objects into one table as illustrated in FIG. 4.

The feature value generation unit 153 generates feature values representing the features of a plurality of pieces of orbit data included in the formatted data information 142. For example, the feature value generation unit 153 extracts orbit data from the formatted data information 142 by using a moving window in predetermined time unit such as one hour or two hours. Then, the feature value generation unit 153 generates feature values on the basis of the extracted orbit data. The feature value generation unit 153 may generate time-series feature values by generating feature values based on the orbit data extracted while shifting the moving window at predetermined time intervals such as every hour.

For example, as feature values of the extracted orbit data, the feature value generation unit 153 generates at least part of the statistical values that can be generated from pieces of orbit data such as a maximum value, a minimum value, a variance, an average, a mean value, a skewness, a kurtosis, a rate of change, a difference, a peak value, and the like of the extracted orbit data. Moreover, the feature value generation unit 153 can generate a value obtained by applying a predetermined process to a generated statistical value such as Fourier transform. The feature value generation unit 153 may generate statistical values from the extracted orbit data and generate statistical values from past related orbit data. Furthermore, when generating feature values, the feature value generation unit 153 may generate feature values representing the feature of the whole of the extracted orbit data and also generate feature values of part of the extracted orbit data. For example, the feature value generation unit 153 can generate a statistical value with respect to the whole of the extracted orbit data. Further, the feature value generation unit 153 can divide the extracted orbit data into a plurality of categories based on a predetermined criteria, and generate a statistical value for each category. Note that the categorizing method is not particularly limited in the present disclosure.

For example, by the method as described above, the feature value generation unit 153 can extract a plurality of feature values based on the orbit data extracted using a moving window. For example, the feature value generation unit 153 may generate feature values in 10 to 100 units based on the orbit data extracted using a moving window. Note that the feature value generation unit 153 may generate feature values representing the feature of the extracted orbit data by means of a method other than that described above.

The dimension reduction unit 154 performs a dimension reduction process of extracting at least part of the feature values generated by the feature value generation unit 153. Moreover, the dimension reduction unit 154 can store the extracted feature value in the storage unit 140 as the feature value information 143.

For example, the dimension reduction unit 154 can perform a dimension reduction process by using a technique such as principal component analysis (PCA), T-distributed Stochastic Neighbor Embedding (t-SNE), Uniform Manifold Approximation and Projection (UMAP), or the like. The dimension reduction unit 154 may perform the dimension reduction process by using a method other than that illustrated above as an example.

The learning unit 155 trains the DNN or the like by performing learning using the feature values included in the feature value information 143. For example, the learning unit 155 performs learning using feature values generated based on orbit data at the normal time in which it is confirmed that no abnormality has occurred. Further, the learning unit 155 stores a model generated as a result of learning in the storage unit 140 as the learned model information 144.

For example, the learning unit 155 trains the DNN or the like by using feature values in unit of a moving window such that an abnormal value that is a value corresponding to a state of the flying object group is output in response to an input of the feature value in unit of a moving window. The learning unit 155 may train the DNN or the like such that an abnormal value is output in response to an input of the feature values related to a plurality of moving windows.

The inference unit 156 acquires an abnormal value that is a value corresponding to a state of the flying object group on the basis of the feature values. For example, the inference unit 156 acquires an abnormal value that is an output from a model, in response to an input of a feature value in which a dimension reduction process has been performed by the dimension reduction unit 154 on the model shown by the learned model information 144. The inference unit 156 may acquire time-series abnormal values in response to inputs input of feature values related to respective moving windows. Further, the inference unit 156 stores the acquired abnormal value in the storage unit 140 as the inference result information 145.

In the case of the present disclosure, the inference unit 156 acquires an abnormal value from a feature value generated based on the orbit data in an unknown state that is subject to abnormality detection, and also acquires an abnormal value from a feature value for comparison. For example, the inference unit 156 inputs a feature value generated based on the orbit data in which whether or not there is an abnormality is unknown, to the model, to thereby acquire an abnormal value in the unknown state. Further, the inference unit 156 inputs, to the model, a feature value generated based on the orbit data at the normal time in which no abnormality has occurred for comparison, to thereby acquire an abnormal value in the normal state. The inference unit 156 may acquire an abnormal value based on the feature value generated based on the orbit data in the abnormal time for comparison.

Note that the orbit data from which a feature value for comparison is generated may be one acquired at the same timing as unknown data, or one acquired at different timing. For example, the orbit data from which a feature value for comparison is generated is orbit data acquired in the past from the same flying object group as the flying object group that is subject to abnormality detection. As an example, the orbit data from which a feature value for comparison is generated may be orbit data in a period that it is confirmed to be normal, acquired from the same flying object group as the flying object group that is subject to abnormality detection. Further, the orbit data from which a feature value for comparison is generated may be data acquired from a flying object group different from the flying object group that is subject to abnormality detection. For example, the orbit data from which a feature value for comparison is generated may be orbit data acquired from a different flying object group determined to fly as similar to the flying object group that is subject to abnormality detection.

The comparison unit 157 functions as a detection unit that detects an abnormality having occurred in the flying object group on the basis of the abnormal value acquired by the inference unit 156. For example, the comparison unit 157 compares the abnormal value acquired by the inference unit 156 to detect an abnormality having occurred in the flying object group that is subject to detection. The comparison unit 157 may compare the abnormal value itself, or compare a statistical value calculated from time-series abnormal values.

For example, the comparison unit 157 can calculate a distance between an abnormal value in an unknown state and an abnormal value in a normal state, and determine the abnormality based on whether or not the calculated distance is equal to or larger than a predetermined threshold. For example, when the calculated distance is equal to or larger than the threshold, the comparison unit 157 can determine that an abnormality has occurred in the flying object group. Note that the distance may be a typical one such as Euclidean distance or Mahalanobis distance.

Further, the comparison unit 157 may determine whether or not an abnormality has occurred by checking whether or not the distance between statistical values or the like calculated from time-series abnormal values is equal to or larger than a predetermined threshold. For example, as illustrated in FIG. 6 as an example, the inference unit 156 can acquire time-series abnormal values in an unknown state and time-series abnormal values in a normal state for comparison. Therefore, the comparison unit 157 may calculate statistical values such as an average, a standard deviation, a minimum value, and a maximum value for the respective time-series abnormal values and compare the calculated statistical values to determine whether or not an abnormality has occurred. For example, when the distance between the calculated statistical values is equal to or larger than a threshold, the comparison unit 157 can determine that an abnormality has occurred in the flying object group.

The output unit 158 outputs a result of comparison by the comparison unit 157, and the like. For example, the output unit 158 transmits a comparison result to an external device via the communication I/F unit 130, or displays it on the screen display unit 120. The output unit 158 may be configured to output the fact that an abnormality has occurred when the comparison unit 157 determines that an abnormality has occurred.

Note that the information to be output by the output unit 158 is not limited to those illustrated above. For example, the output unit 158 may be configured to output time-series inference result information 145 as illustrated in FIG. 6 and the like, together with a comparison result or the like.

An example of the configuration of the detection device 100 is as described above. Next, an example of operation of the detection device 100 will be described with reference to FIGS. 7 and 8.

FIG. 7 is a flowchart illustrating an example of operation of the detection device 100 at the time of learning a model. Referring to FIG. 7, the data acquisition unit 151 acquires orbit data and information such as acquisition time of the orbit data from flying objects and other external devices (step S101). For example, the data acquisition unit 151 acquires orbit data at the normal time in which no abnormality has occurred, as data for learning.

The data formatting unit 152 performs a formatting process that is a process of sorting data according to the time, on the pieces of data acquired by the data acquisition unit 151 (step S102). For example, the data formatting unit 152 may fill the missing values or process the overlapping values.

The feature value generation unit 153 generates feature values representing the features of the orbit data included in the formatted data information 142 (step S103). For example, the feature value generation unit 153 extracts orbit data from the formatted data information 142 by using a moving window in a predetermined time unit such as one hour or two hours. Then, the feature value generation unit 153 generates feature values based on the extracted orbit data. The feature value generation unit 153 may generate time-series feature values by generating feature values based on the orbit data extracted while shifting the moving window at predetermined time intervals such as every hour.

The dimension reduction unit 154 performs a dimension reduction process of extracting at least part of the feature values generated by the feature value generation unit 153 (step S104). The dimension reduction unit 154 may perform the dimension reduction process by using a technique such as main component analysis.

The learning unit 155 performs learning using the feature values on which the dimension reduction process has been performed by the dimension reduction unit 154 to train the DNN or the like (step S105). For example, the learning unit 155 trains the DNN or the like so as to output an abnormal value that can be used for detecting an abnormality having occurred in the flying object group in response to an input of a feature value in unit of a moving window.

The example of operation at the time of learning is as described above. Next, an example of operation at the time of detecting an abnormality will be described with reference to FIG. 8.

FIG. 8 is a flowchart illustrating an example of operation of the detection device 100 at the time of detecting an abnormality. Referring to FIG. 8, the data acquisition unit 151 acquires orbit data and information such as acquisition time of the orbit data from flying objects and other external devices (step S201). For example, the data acquisition unit 151 acquires orbit data in an unknown state. Besides the orbit data in an unknown state, the data acquisition unit 151 may acquire orbit data at the normal time in which no abnormality has occurred, or the like.

The data formatting unit 152 performs a formatting process that is a process of sorting data according to the time, on the pieces of data acquired by the data acquisition unit 151 (step S202). For example, the data formatting unit 152 may fill the missing values or process the overlapping values.

The feature value generation unit 153 generates feature values representing the features of the orbit data included in the formatted data information 142 (step S203). For example, the feature value generation unit 153 extracts orbit data from the formatted data information 142 by using a moving window in a predetermined time unit such as one hour or two hours. Then, the feature value generation unit 153 generates feature values based on the extracted orbit data. The feature value generation unit 153 may generate time-series feature values by generating feature values based on the orbit data extracted while shifting the moving window at predetermined time intervals such as every hour.

The dimension reduction unit 154 performs a dimension reduction process of extracting at least part of the feature values generated by the feature value generation unit 153 (step S204). The dimension reduction unit 154 may perform the dimension reduction process by using a technique such as main component analysis.

The inference unit 156 acquires an abnormal value that is an output from a model, in response to an input of a feature value in which a dimension reduction process has been performed by the dimension reduction unit 154 on the model shown by the learned model information 144 (step S205). The inference unit 156 may acquire time-series abnormal values in response to inputs of feature values related to respective moving windows. For example, the inference unit 156 acquires an abnormal value from a feature value generated based on the orbit data in an unknown state that is subject to abnormality detection, and also acquires an abnormal value from a feature value for comparison.

The comparison unit 157 compares the abnormal values acquired by the inference unit 156 to thereby detect an abnormality having occurred in the flying object group that is subject to detection (step S206). For example, the comparison unit 157 may calculate a distance between an abnormal value in an unknown state and an abnormal value in a normal state, and determine abnormality based on whether or not the calculated distance is equal to or larger than a predetermined threshold. The comparison unit 157 may compare the abnormal values themself, or compare statistical values calculated from the time-series abnormal values or the like.

Note that when the comparison unit 157 detects an abnormality, the output unit 158 may output the fact that an abnormality is detected.

An example of operation of the detection device 100 at the time of detecting an abnormality is as described above.

As described above, the detection device 100 includes the feature value generation unit 153 and the learning unit 155. With this configuration, the learning unit 155 can train the model of outputting an abnormal value that is a value capable of being used for detecting an abnormality having occurred in the flying object group, by using the feature values based on the orbit data by the feature value generation unit 153. As a result, by using the trained model, it is possible to easily detect an abnormality having occurred in the flying object group.

Further, the detection device 100 includes the dimension reduction unit 154. With this configuration, the learning unit 155 can learn the model by using part of the feature values generated by the feature value generation unit 153 based on the orbit data. Thereby, since it is possible to learn the model by using a result of performing dimension reduction after generating a large amount of feature values, it is possible to perform learning by using feature values more suitable for learning of the model.

Further, the detection device 100 includes the data formatting unit 152. As described above, orbit data may be acquired at different timing for each flying object. By generating feature values by using a result of the formatting process performed by the data formatting unit 152, even when there are variations in the acquisition timing of the orbit data, it is possible to generate feature values more appropriately.

Further, the detection device 100 includes the inference unit 156 and the comparison unit 157. With this configuration, by comparing the abnormal values acquired by the inference unit 156, the comparison unit 157 can detect an abnormality having occurred in the flying object group that is subject to detection. That is, according to the configuration described above, it is possible to easily detect an abnormality by using the model learned by the learning unit 155.

Note that the present disclosure describes an example of the configuration of the detection device 100. However, the configuration of the detection device 100 is not limited to the case illustrated in the present disclosure. For example, the detection device 100 may not include the data formatting unit 152. Moreover, the detection device 100 may not include the dimension reduction unit 154. For example, as described above, the detection device 100 may be configured of part of the configuration described in the present disclosure.

Further, the present disclosure illustrates, as an example, the case where the detection device 100 detects an abnormality based on the result of comparison by the comparison unit 157. However, the detection device 100 may be configured to determine whether or not there is an abnormality by, for example, checking whether nor not the abnormal value acquired by the inference unit 156 is equal to or larger than a predetermined threshold, or the like. For example, as described above, the detection device 100 may detect an abnormality based on the feature values by a method other that illustrated as an example in the present disclosure.

Second Example Embodiment

Figure 9:
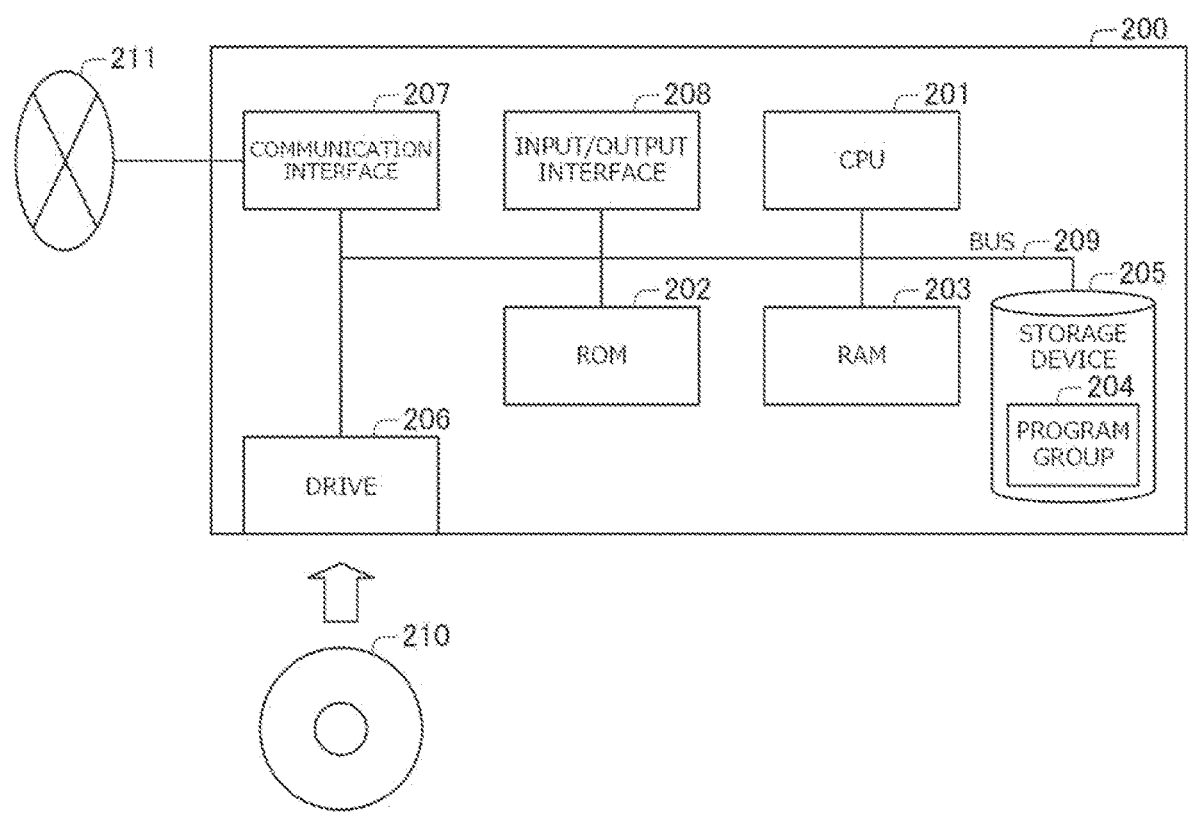
FIG. 9 illustrates an example of a hardware configuration of a detection device according to a second example embodiment of the present disclosure.
Figure 10:
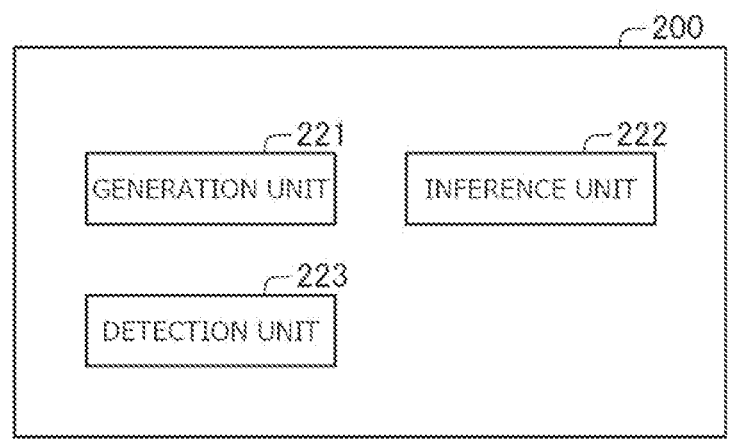
FIG. 10 is a block diagram illustrating an example of a configuration of a detection device.
Figure 11:
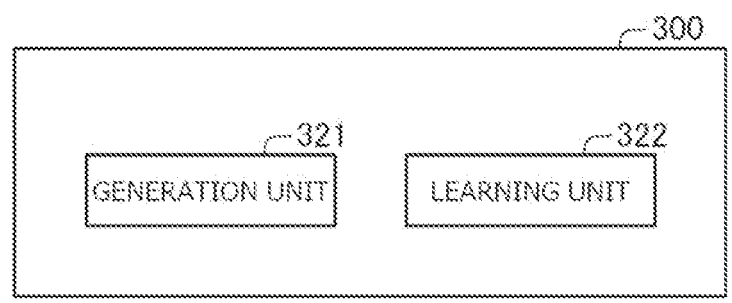
FIG. 11 is a block diagram illustrating an example of a configuration of a learning device.

Next, a second example embodiment of the present disclosure will be described with reference to FIGS. 9 to 11. FIG. 9 is a diagram illustrating an example of a hardware configuration of a detection device 200. FIG. 10 is a block diagram illustrating an example of a configuration of the detection device 200. FIG. 11 is a block diagram illustrating an example of a configuration of a learning device 300.

The second example embodiment of the present disclosure describes an example of a configuration of the detection device 200 that is an information processing device that detects an abnormality having occurred in a flying object group, on the basis of orbit data representing a state of each flying object included in the flying object group. The second example embodiment also describes an example of a configuration of the learning device 300 that performs training of a model on the basis of orbit data representing a state of each flying object included in the flying object group. FIG. 9 illustrates an example of a hardware configuration of the detection device 200. Referring to FIG. 9, the detection device 200 has a hardware configuration as described below, as an example.

Central Processing Unit (CPU) 201 (arithmetic device)
Read Only Memory (ROM) 202 (storage device)
Random Access Memory (RAM) 203 (storage device)
Program group 204 to be loaded to the RAM 203
Storage device 205 storing therein the program group 204
Drive 206 that performs reading and writing on a storage medium 210 outside the information processing device
Communication interface 207 connecting to a communication network 211 outside the information processing device
Input/output interface 208 for performing input/output of data
Bus 209 connecting the respective constituent elements Further, the detection device 200 can realize functions as a generation unit 221, an inference unit 222, and a detection unit 223 illustrated in FIG. 10 through acquisition of the program group 204 by the CPU 201 and execution of the program by the CPU 201. Note that the program group 204 is stored in the storage device 205 or the ROM 202 in advance for example, and is loaded to the RAM 203 or the like by the CPU 201 as needed. Further, the program group 204 may be provided to the CPU 201 via the communication network 211, or may be stored on a storage medium 210 in advance and read out by the drive 206 and supplied to the CPU 201.

FIG. 9 illustrates an example of a hardware configuration of the detection device 200. The hardware configuration of the detection device 200 is not limited to that described above. For example, the detection device 200 may be configured of part of the configuration described above, such as without the drive 206. Moreover, the CPU 201 may be a GPU or the like illustrated in the first example embodiment.

The generation unit 221 generates feature values representing the features of a plurality of pieces of orbit data, on the basis of the orbit data representing the state of each flying object included in the flying object group.

The inference unit 222 acquires a value corresponding to the state of the flying object group on the basis of the feature values generated by the generation unit 221.

The detection unit 223 detects an abnormality having occurred in the flying object group on the basis of the value corresponding to the state of the flying object group acquired by the inference unit 222.

As described above, the detection device 200 includes the generation unit 221, the inference unit 222, and the detection unit 223. With this configuration, the detection unit 223 can detect an abnormality having occurred in the flying object group on the basis of a value corresponding to a state of the flying object group acquired by the inference unit 222 on the basis of the feature values generated by the generation unit 221. As a result, it is possible to easily detect an abnormality having occurred in the flying object group.

Note that the detection device 200 described above can be realized by incorporating a predetermined program in an information processing device such as the detection device 200. Specifically, a program that is another aspect of the present invention is a program for causing an information processing device such as the detection device 200 to execute processing to generate feature values representing features of a plurality of pieces of orbit data on the basis of the orbit data representing a state of each flying object included in a flying object group, acquire a value corresponding to a state of the flying object group on the basis of the generated feature values, and detect an abnormality having occurred in the flying object group on the basis of the acquired value corresponding to the flying object group.

Further, a processing method to be executed by an information processing device such as the detection device 200 is a method of generating feature values representing features of a plurality of pieces of orbit data on the basis of the orbit data representing a state of each flying object included in a flying object group, acquiring a value corresponding to a state of the flying object group on the basis of the generated feature values, and detecting an abnormality having occurred in the flying object group on the basis of the acquired value corresponding to the flying object group.

Even an invention of a program, a computer-readable storage medium storing thereon a program, or a processing method having the above-described configuration also exhibits the same actions and effects as those of the detection device 200. Therefore, the above-described object of the present disclosure can also be achieved by such an invention.

Moreover, even the learning device 300 that learns a model usable in the detection device 200, a learning method to be performed by the learning device 300, or a program can achieve the same object. For example, the learning device 300 includes a generation unit 321 that generates feature values representing features of a plurality of pieces of orbit data on the basis of the orbit data representing a state of each flying object included in a flying object group, and a learning unit 322 that, on the basis of the feature values generated by the generation unit 321, trains a model so as to output a value corresponding to a state of the flying object group in response to an input of the feature values. Note that the hardware configuration of the learning device 300 may be similar to the configuration of the detection device 200 described with reference to FIG. 9.

Supplementary Notes

The whole or part of the example embodiments disclosed above can be described as the following supplementary notes. Hereinafter, the outlines of a detection device and the like of the present invention will be described. However, the present invention is not limited to the configurations described below.

(Supplementary Note 1)
A detection device comprising:
a generation unit that generates feature values representing features of a plurality of pieces of orbit data, on the basis of the orbit data representing a state of each of flying objects included in a flying object group;
an inference unit that acquires a value corresponding to a state of the flying object group on the basis of the feature values generated by the generation unit; and a detection unit that detects an abnormality having occurred in the flying object group on the basis of the acquired value corresponding to the state of the flying object group.

(Supplementary Note 2)

The detection device according to supplementary note 1, wherein
the inference unit acquires a value corresponding to the state of the flying object group from feature values generated on the basis of orbit data in an unknown state that is subject to abnormality detection, and acquires a value corresponding to the state of the flying object group from feature values for comparison; and
the detection unit detects an abnormality according to a comparison result of the values acquired by the inference unit.

(Supplementary Note 3)

The detection device according to supplementary note 2, wherein
the detection unit detects that an abnormality has occurred when a distance between the values corresponding to the state of the flying object group, acquired by the inference unit, is equal to or larger than a predetermined threshold.

(Supplementary Note 4)

The detection device according to any one of supplementary notes 1 to 3, further comprising
a dimension reduction unit that extracts at least part of the feature values generated by the generation unit; wherein
the inference unit acquires a value corresponding to the state of the flying object group on the basis of the feature values extracted by the dimension reduction unit.

(Supplementary Note 5)

The detection device according to any one of supplementary notes 1 to 4, further comprising
a formatting unit that performs a formatting process to sort orbit data according to time, on the orbit data of each of the flying objects acquired at different time, wherein
the generation unit generates the feature values on the basis of a result of the formatting process by the formatting unit.

(Supplementary Note 6)

The detection device according to any one of supplementary notes 1 to 5, wherein
the inference unit inputs the feature values, generated by the generation unit, to a model trained to output a value corresponding to the state of the flying object group in response to an input of the feature values, to thereby acquire a value corresponding to the state of the flying object group on the basis of the feature values generated by the generation unit.

(Supplementary Note 7)

The detection device according to any one of supplementary notes 1 to 6, wherein
the generation unit extracts orbit data in a predetermined time unit and, on the basis of the extracted orbit data, generates a feature value representing a feature of the whole of the extracted orbit data.

(Supplementary Note 8)

A detection method comprising, by an information processing device:
generating feature values representing features of a plurality of pieces of orbit data, on the basis of the orbit data representing a state of each of flying objects included in a flying object group;
acquiring a value corresponding to a state of the flying object group on the basis of the generated feature values; and
detecting an abnormality having occurred in the flying object group on the basis of the acquired value corresponding to the state of the flying object group.

(Supplementary Note 9)

A program for implementing, on an information processing device, processing to:
generate feature values representing features of a plurality of pieces of orbit data, on the basis of the orbit data representing a state of each of flying objects included in a flying object group;
acquire a value corresponding to a state of the flying object group on the basis of the generated feature values; and
detect an abnormality having occurred in the flying object group on the basis of the acquired value corresponding to the state of the flying object group.

(Supplementary Note 10)

A learning device comprising:
a generation unit that generates feature values representing features of a plurality of pieces of orbit data, on the basis of the orbit data representing a state of each of flying objects included in a flying object group; and
a learning unit that, on the basis of the generated feature values, trains a model so as to output a value corresponding to a state of the flying object group in response to an input of the feature values.

(Supplementary Note 11)

A learning method comprising, by an information processing device:
generating feature values representing features of a plurality of pieces of orbit data, on the basis of the orbit data representing a state of each of flying objects included in a flying object group; and
on the basis of the generated feature values, training a model so as to output a value corresponding to a state of the flying object group in response to an input of the feature values.

(Supplementary Note 12)

A program for implementing, on an information processing device, processing to:
generate feature values representing features of a plurality of pieces of orbit data, on the basis of the orbit data representing a state of each of flying objects included in a flying object group; and
on the basis of the generated feature values, train a model so as to output a value corresponding to a state of the flying object group in response to an input of the feature values.

It should be noted that the program described in the example embodiments and the supplementary notes may be stored in a storage device or stored on a storage medium readable by a computer. For example, a storage medium is a portable medium such as a flexible disk, an optical disk, a magneto-optical disk, or a semiconductor memory.

While the present invention has been described with reference to the example embodiments described above, the present invention is not limited to the above-described embodiments. The form and details of the present invention can be changed within the scope of the present invention in various manners that can be understood by those skilled in the art.

REFERENCE SIGNS LIST 100 detection device
110 operation input unit
120 screen display unit
130 communication I/F unit
140 storage unit
141 orbit data information
142 formatted data information
143 feature value information
144 learned model information
145 inference result information
146 program
150 arithmetic processing unit
151 data acquisition unit
152 data formatting unit
153 feature value generation unit
154 dimension reduction unit
155 learning unit
156 inference unit
157 comparison unit
158 output unit
200 detection device
201 CPU
202 ROM
203 RAM
204 program group
205 storage device
206 drive
207 communication interface
208 input/output interface
209 bus
210 storage medium
211 communication network
221 generation unit
222 inference unit
223 detection unit
300 learning device
321 generation unit
322 learning unit

The invention claimed is:

1. A detection device comprising:
at least one memory configured to store instructions; and
at least one processor configured to execute instructions to:
generate feature values representing features of a plurality of pieces of orbit data, on a basis of the orbit data representing a state of each of flying objects included in a flying object group;
acquire a value corresponding to a state of the flying object group on a basis of the generated feature values; and
detect an abnormality having occurred in the flying object group on a basis of the acquired value corresponding to the state of the flying object group.

2. The detection device according to claim 1, wherein the at least one processor is configured to execute the instructions to:
acquire a value corresponding to the state of the flying object group from feature values generated on a basis of orbit data in an unknown state that is subject to abnormality detection, and acquire a value corresponding to the state of the flying object group from feature values for comparison; and
detect an abnormality according to a comparison result of the acquired values.

3. The detection device according to claim 2, wherein the at least one processor is configured to execute the instructions to
detect that an abnormality has occurred when a distance between the acquired values corresponding to the state of the flying object group is equal to or larger than a predetermined threshold.

4. The detection device according to claim 1, wherein the at least one processor is configured to execute the instructions to:
perform a dimension reduction process of extracting at least part of the generated feature values; and
acquire a value corresponding to the state of the flying object group on a basis of the feature values extracted by the dimension reduction process.

5. The detection device according to claim 1, wherein the at least one processor is configured to execute the instructions to:
perform a formatting process to sort orbit data according to time, on the orbit data of each of the flying objects acquired at different time; and
generate the feature values on a basis of a result of the formatting process.

6. The detection device according to claim 1, wherein the at least one processor is configured to execute the instructions to
by inputting the generated feature values to a model trained to output a value corresponding to the state of the flying object group in response to an input of the feature values, acquire a value corresponding to the state of the flying object group on the basis of the generated feature values.

7. The detection device according to claim 1, wherein the at least one processor is configured to execute the instructions to
extract orbit data in a predetermined time unit and, on a basis of the extracted orbit data, generate a feature value representing a feature of whole of the extracted orbit data.

8. A detection method comprising, by an information processing device:
generating feature values representing features of a plurality of pieces of orbit data, on a basis of the orbit data representing a state of each of flying objects included in a flying object group;
acquiring a value corresponding to a state of the flying object group on a basis of the generated feature values; and
detecting an abnormality having occurred in the flying object group on a basis of the acquired value corresponding to the state of the flying object group.

9. A non-transitory computer-readable medium storing thereon a program comprising instructions for causing an information processing device to execute processing to:
generate feature values representing features of a plurality of pieces of orbit data, on a basis of the orbit data representing a state of each of flying objects included in a flying object group;
acquire a value corresponding to a state of the flying object group on a basis of the generated feature values; and
detect an abnormality having occurred in the flying object group on a basis of the acquired value corresponding to the state of the flying object group.

* * * * *